United States Patent
Gattone

(10) Patent No.: US 8,033,700 B2
(45) Date of Patent: Oct. 11, 2011

(54) TRAVEL LIMITING HEADLAMP ADJUSTER

(75) Inventor: Michael T. Gattone, Tinley Park, IL (US)

(73) Assignee: Asyst Technologies L.L.C., Kenosha, WI (US)

( * ) Notice: Subject to any disclaimer, the term of this patent is extended or adjusted under 35 U.S.C. 154(b) by 267 days.

(21) Appl. No.: 12/429,021

(22) Filed: Apr. 23, 2009

(65) Prior Publication Data

US 2009/0273943 A1 Nov. 5, 2009

Related U.S. Application Data

(60) Provisional application No. 61/050,001, filed on May 2, 2008.

(51) Int. Cl.
*F21V 33/00* (2006.01)

(52) U.S. Cl. .......................................... 362/515; 362/514

(58) Field of Classification Search .................. 362/515, 362/514, 512, 271, 272, 273, 274, 342
See application file for complete search history.

(56) References Cited

U.S. PATENT DOCUMENTS

| | | |
|---|---|---|
| 5,079,676 A | 1/1992 | Lisak |
| 5,214,971 A | 6/1993 | Burton et al. |
| 5,390,098 A | 2/1995 | Reiland |
| 5,653,548 A | 8/1997 | Amdahl |
| 5,669,695 A | 9/1997 | Parker et al. |
| 5,707,133 A | 1/1998 | Burton |
| 6,017,136 A | 1/2000 | Burton |
| 6,042,254 A | 3/2000 | Burton |
| 6,050,712 A | 4/2000 | Burton |
| 6,244,735 B1 | 6/2001 | Burton |
| 6,257,747 B1 | 7/2001 | Burton |
| 6,527,427 B1 | 3/2003 | Schoeder |
| 6,773,153 B2 | 8/2004 | Burton |
| 6,918,691 B2 | 7/2005 | Gattone |
| 6,974,231 B2 | 12/2005 | Burton |
| 7,004,607 B2 | 2/2006 | Aguinaga |
| 7,040,788 B2 | 5/2006 | Brazas et al. |
| 7,052,164 B2 | 5/2006 | Burton |
| 7,066,632 B2 | 6/2006 | Burton |
| 7,114,835 B2 | 10/2006 | Brazas |
| 7,118,259 B2 | 10/2006 | Fladhammer |
| 7,150,541 B2 | 12/2006 | Burton |
| 7,198,392 B2 | 4/2007 | Hobbs et al. |
| 7,264,376 B2 | 9/2007 | Burton |
| 7,326,014 B2 | 2/2008 | Levey |

(Continued)

FOREIGN PATENT DOCUMENTS

CA 2131152 9/1993

(Continued)

*Primary Examiner* — Laura Tso

(74) *Attorney, Agent, or Firm* — Brian G. Gilpin; Godfrey & Kahn, S.C.

(57) ABSTRACT

A headlamp adjuster includes an adjustment gear for axially positioning an output shaft relative to a housing of the adjuster. A driving engagement of the adjustment gear and output shaft runs out at either axial extreme position to which the output shaft can be adjusted, and rotation of the adjustment gear can continue without further movement of the output shaft and without damage to the adjuster or a headlamp assembly in which the adjuster is installed. Biasing assemblies urge the output shaft toward re-engagement with the adjustment gear when the drive direction is reversed.

13 Claims, 5 Drawing Sheets

U.S. PATENT DOCUMENTS

| | | |
|---|---|---|
| 7,354,183 B2 | 4/2008 | Burton |
| 7,438,457 B2 | 10/2008 | Whynott |
| 7,517,123 B2 | 4/2009 | Aguinaga et al. |
| 2005/0145050 A1* | 7/2005 | Fladhammer .................. 74/318 |
| 2008/0175014 A1 | 7/2008 | Fladhammer |
| 2008/0291690 A1* | 11/2008 | Gattone et al. ................ 362/524 |
| 2009/0003969 A1 | 1/2009 | Gattone et al. |

FOREIGN PATENT DOCUMENTS

| | | |
|---|---|---|
| WO | 2005042304 | 10/2005 |

* cited by examiner

TRAVEL LIMITING HEADLAMP ADJUSTER

CROSS-REFERENCE TO RELATED APPLICATIONS

The present United States patent application claims the benefits of U.S. Provisional Application Ser. No. 61/050,001, filed May 2, 2008.

FIELD OF THE INVENTION

The present invention relates generally to screw-type adjustment mechanisms and, more particularly, the invention relates to adjustment mechanisms useful for adjusting the aim of motor vehicle headlights.

BACKGROUND OF THE INVENTION

The direction of light output from headlamps on motor vehicles requires proper aiming, both vertically and horizontally, for safe and optimal performance. Accordingly, adjustment or "aiming" is performed before a vehicle is put into service and may be performed from time to time thereafter if vibration or other conditions or events move the headlamp away from optimal positioning. It is known to provide headlamp assemblies adjustable about both vertical and horizontal axes with adjusters operated by screwdrivers or other implements for lengthening and shortening the adjuster to cause the headlamp assembly to pivot about an axis. Some known adjustment mechanisms include bushings, bosses, O-rings and push nuts that need to be connected to a screw during installation. Although adjusters of this type have proven to be useful, because of the many individual components required, labor for assembly and installation are high. It is preferable to have a pre-assembled adjuster that can be installed quickly and easily in the headlamp assembly and be ready for immediate adjustment.

In some known adjuster configurations, an output shaft is operatively connected to a movable reflector in the headlamp assembly. Linear movement of the adjuster output shaft pivots the reflector to change the direction of light reflected therefrom. In the adjuster, one or several gears can be driven by screwdrivers or other implements for rotating mechanisms in the adjuster and causing linear movement of the output shaft. Problems and difficulties can be encountered if the adjuster is adjusted too far in either direction. If moved axially longer than intended, the headlamp assembly or the adjuster can be damaged, requiring repair or replacement. If withdrawn too far, the output shaft can become disengaged from its driving mechanisms, again causing difficulties and problems which may require replacement or disassembly and repair. When such over adjustment occurs on an assembly line, assembly line output is adversely affected. If over adjustment occurs after the vehicle has been placed in use, access for repairing or replacing the adjustment mechanism can require significant disassembly and cost in time and expense. Placing axial restraints on the movement of the output shaft of the adjuster can eliminate the problem of over adjustment in either direction, but also may result in damage to the drive mechanisms of the adjuster if the restraints are encountered and adjustment attempts continue. Damage may be more likely if powered tools are used for effecting the adjustment.

What is needed is a headlamp adjusted that can tolerate over adjustment in either direction, without damage to the adjuster or to the headlamp assembly in which it is installed, and without becoming disengaged to the extent of being nonfunctional for all purposes.

SUMMARY OF THE INVENTION

The present invention provides a headlamp adjuster that allows the cooperating threads of the output shaft and a female complement in the housing to disengage when maximum adjustment distance, or output shaft travel, has been reached in either direction, but retains the last thread of the shaft in position to re-engage when the adjustment direction is reversed.

In one form thereof, a travel limiting headlamp adjuster has a housing, a shaft extending through the housing with at least one end protruding outwardly of the housing and a thread provided along a portion of a length of the shaft. The shaft is axially moveable relative to the housing between first and second axially extreme adjusted positions relative to the housing. An adjustment gear engages the thread between the first and second axially extreme adjusted positions of the shaft so that rotation of the adjustment gear causes axial movement of the shaft between the first and second axially extreme adjusted positions. The thread and the adjustment gear are drivingly disengaged at the axially extreme adjusted positions of the shaft. Biasing structures are activated when the thread on the shaft and the adjustment gear are disengaged at the first and second axially extreme adjusted positions to urge the shaft toward re-engagement of the thread with the adjustment gear.

In another form thereof, a travel limiting headlamp adjuster provides a housing, a shaft extending through the housing with an end for engaging a headlamp reflector and a thread provided along a portion of a length of the shaft. An adjustment gear disposed rotatably on the shaft and in the housing engages the thread between first and second axially extreme positions for the shaft and disengages the thread for positions of the shaft beyond the first and second axially extreme positions. Compressible members axially restrained relative to movement of the shaft are compressed when the adjustment gear is disengaged from the thread.

In still another form thereof, a travel limiting headlamp adjuster provides a housing and a shaft axially movable relative to the housing between first and second axially extreme positions. The shaft is axially constrained against further movement beyond the first and second axially extreme positions. The shaft is biased in an opposite direction at each of the first and second axially extreme positions.

An advantage of the travel limiting headlamp adjuster, in at least one form thereof, is limiting adjustment of the adjuster between extreme adjusted positions while allowing continued attempted adjustment without damage to the adjuster or an assembly in which it is installed.

Another advantage of the travel limiting headlamp adjuster, in at least one form thereof, is disengaging an output shaft of the adjuster from an input drive when the adjuster reaches a maximum adjusted position.

Still another advantage of the travel limiting headlamp adjuster, in at least one form thereof, is providing an adjuster that disengages from and reengages to drive mechanisms win maximum adjusted positions are reached and drive input is reversed.

Yet another advantage of the travel limiting headlamp adjuster, in at least one form thereof, is providing a headlamp adjuster that minimizes damage to the adjuster or an assembly in which it is installed when over adjustment is attempted.

Other features and advantages of the invention will become apparent to those skilled in the art upon review of the following detailed description, claims and drawings in which like numerals are used to designate like features.

Figure 1:
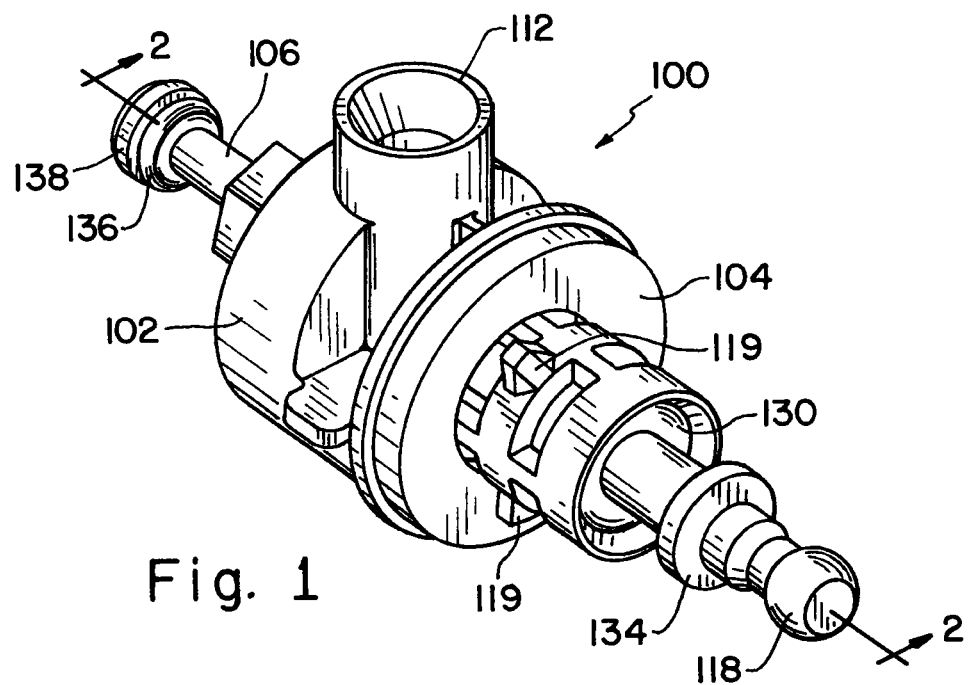
FIG. 1 is an isometric view of a travel limiting headlamp adjuster in accordance with an embodiment.
Figure 2:
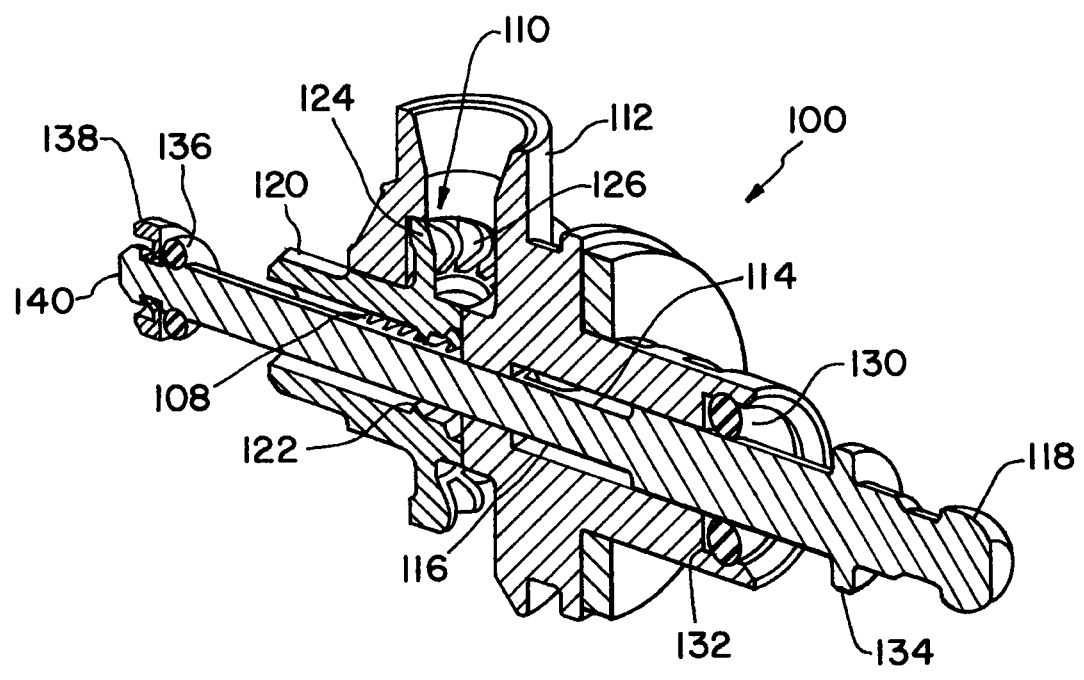
FIG. 2 is a cross-sectioned isometric view of the headlamp adjuster shown in FIG. 1, taken along line 2-2 of FIG. 1.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Referring now more specifically to the drawings and to FIG. 1 in particular, a traveling limiting headlamp adjuster 100 is shown. Advantageously, headlamp adjuster 100 can be made of plastic or, alternatively, of other non-corrosive materials such as zinc, stainless steel or the like. As a further alternative, inexpensive metals also can be used for some or all of the components to be described hereinafter.

Adjuster 100 includes a housing 102 having a gasket 104 providing a seal upon installation in a headlamp assembly. An output screw or shaft 106 extends through housing 102 and has ends thereof extending outwardly from housing 102. Shaft 106 has a screw thread or threads 108 thereon engaged with an adjustment gear 110 rotatably held in housing 102. Adjustment gear 110 is rotated by a tool or implement (not shown) inserted through a receiver 112 formed in housing 102.

Screw thread or threads 108 can be continuous or discontinuous screw-type threads surrounding shaft 106. In one advantageous exemplary embodiment shown, flattened faces 114, 116 are provided on opposite sides of shaft 106 such that shaft 106 is held rotationally stable about its longitudinal axis during the operation of adjuster 100. As those skilled in the art will fully understand, housing 102 can be secured in a headlamp assembly, with output shaft 106 attached to a pivoting headlamp reflector (not shown) so that axial movement of output shaft 106 causes pivotal movement of the reflector so that the directional aim of the headlamp assembly can be changed. Operative connection of output shaft 106 to a reflector (not shown) can be made using a bulbous end 118 of shaft 106 received in a cup (not shown), and connection of housing 102 within a headlamp assembly can be made via a plurality of locking tabs 119, again as those skilled in the art will understand.

Adjustment gear 110 includes a sleeve 120 rotatable around shaft 106, sleeve 120 having an inwardly directed protrusion or protrusions 122 in the nature of drive teeth or threads for engaging thread or threads 108 on shaft 106. Gear 110 further includes a head 124 at one end of sleeve 120 and preferably integral with sleeve 120. Head 124 includes teeth 126 on a face thereof exposed in receiver 112 whereby a tool or implement inserted into receiver 112 can be used to operatively engage teeth 126 for rotating adjustment gear 110. Rotation of gear 110 engaged with shaft 106 causes axial movement of shaft 106 relative to housing 102, in either direction, depending on the direction of rotation of adjustment gear 110.

An O-ring 130 in a cavity 132 at one end of housing 102 provides a seal against the sliding shaft 106 to inhibit contamination entering the housing. A molded collar 134 is provided at one end of shaft 106 on one side of housing 102 outwardly of O-ring 130. A second O-ring 136 is disposed on the opposite end of shaft 106 on the opposite side of housing 102 and against a snap-on collar 138 that is securable to shaft 106 outwardly of O-ring 136 and against an end 140 of shaft 106.

To operate adjuster 100, a tool or implement is inserted into receiver 112 to engage gear teeth 126. Rotation of the tool or implement rotates head 124 and sleeve 120 connected thereto. As protrusion or protrusions 122 move together with sleeve 120, shaft 106 is caused to move axially relative to housing 102 due to the driving engagement of shaft threads 108 together with protrusion or protrusions 122. Axial movement of shaft 106 is used to effect movement of headlamp assembly components, such as a reflector, for adjusting the aim of a beam of light from the headlamp assembly, as those skilled in the art will understand readily.

O-rings 130, 136 and collars 134, 138 provide axial stops and spring force resistance to the movement of shaft 106 in either direction beyond first and second axially extreme adjusted positions. As shaft 106 reaches its travel limit so that protrusion or protrusions 122 no longer engage screw thread or threads 108 at either end thereof, adjustment gear 110 can be continually rotated without further advancement of shaft 106. Since shaft 106 remains in the extreme axially adjusted position, yet adjustment gear 100 can rotate freely, the potential for damage to the headlamp assembly or adjuster 100 from over adjustment is minimized.

Figure 3:
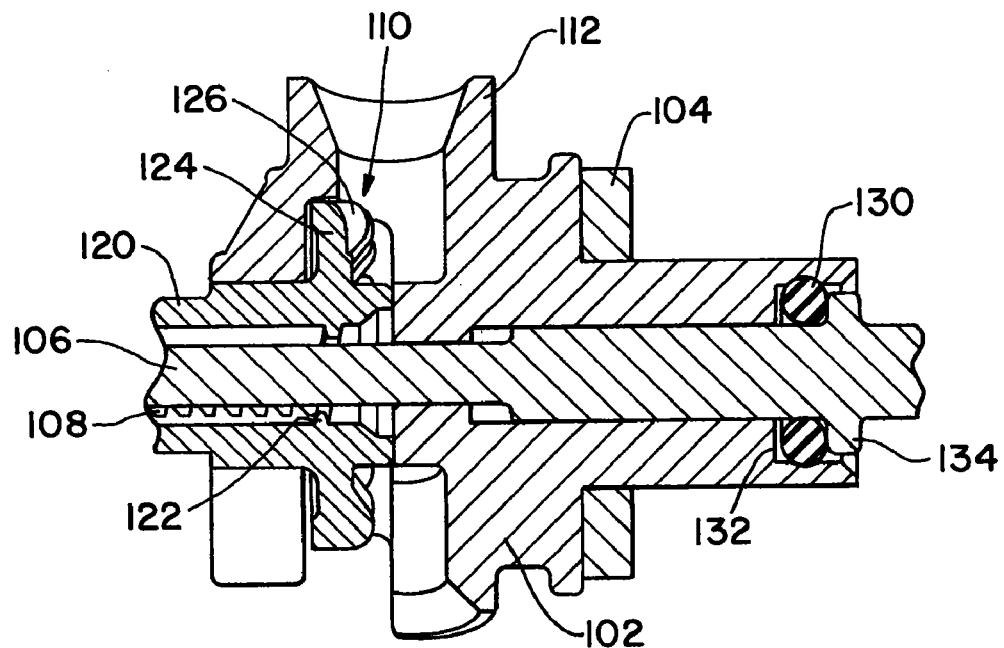
FIG. 3 is an enlarged, fragmentary, cross-sectional view of one end of the headlamp adjuster shown in FIGS. 1, illustrating the adjuster in one maximum adjusted position.

More specifically, as adjustment gear 100 is rotated in a first direction whereby axial movement of output shaft 106 is such as to draw bulbous end 118 toward housing 102, an extreme axially adjusted position is reached where protrusion or protrusions 122 are advanced past the last screw thread or threads 108 on output shaft 106. Output shaft 106 is at an inward travel limit, and if adjustment gear 110 is further rotated at the inward travel limit, a first clutching position is reached, as shown in FIG. 3. At this position, all internal threads or protrusions 122 have run past the external screw threads 108 of output shaft 106, and shaft 106 is disengaged from adjustment gear 110. As protrusion or protrusions 120 rotate against the end of screw thread or threads 108, O-ring 130 within cavity 132 is compressed between the base of cavity 132 and molded collar 134. The compression of O-ring 130 provides spring force in the opposite direction, so that output shaft 106 is urged to a position for re-engagement of screw threads 108 with protrusion or protrusions 122 when gear 110 is rotated in a second, opposite direction. Accordingly, rotation of adjustment gear 110 in the second direction causes re-engagement between adjustment gear 110 and output shaft 106 for the movement of output shaft 106 in the opposite direction in which bulbous end 118 is moved away from housing 102.

Figure 4:
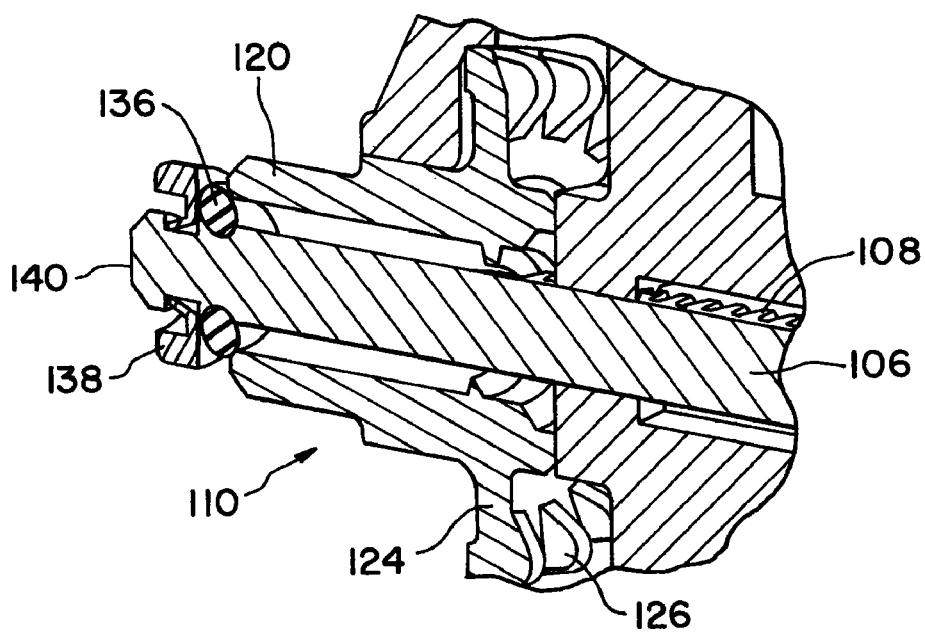
FIG. 4 is an enlarged, fragmentary, cross-sectional view of the end of the headlamp adjuster opposite the end shown in FIG. 3, but illustrating the adjuster in a second maximum adjusted position.
Figure 5:
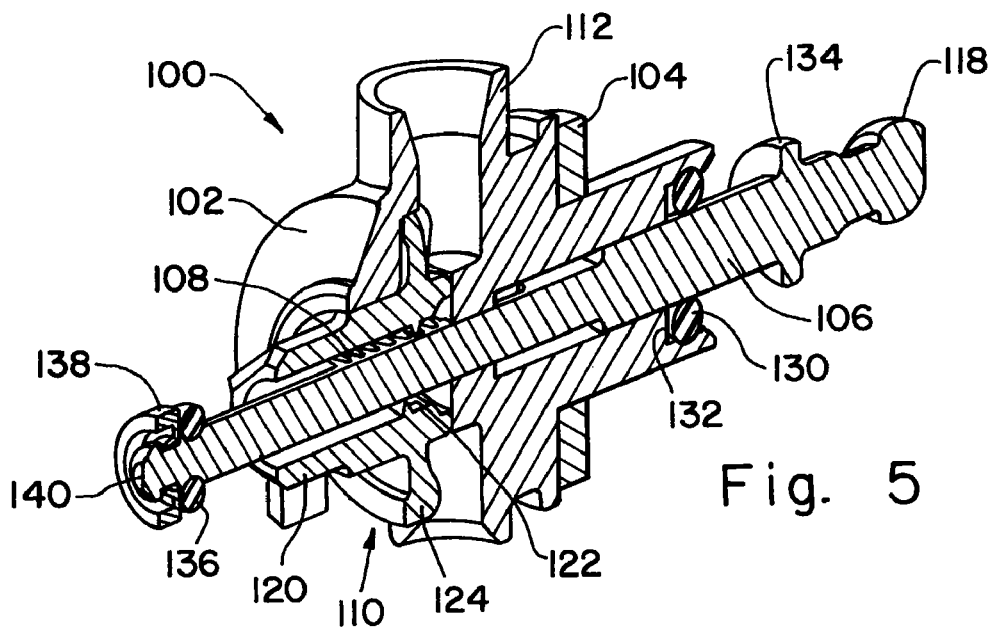
FIG. 5 is a view similar to that of FIG. 2, but showing the travel limiting headlamp adjuster from a different angle than that shown in FIG. 2.
Figure 6:
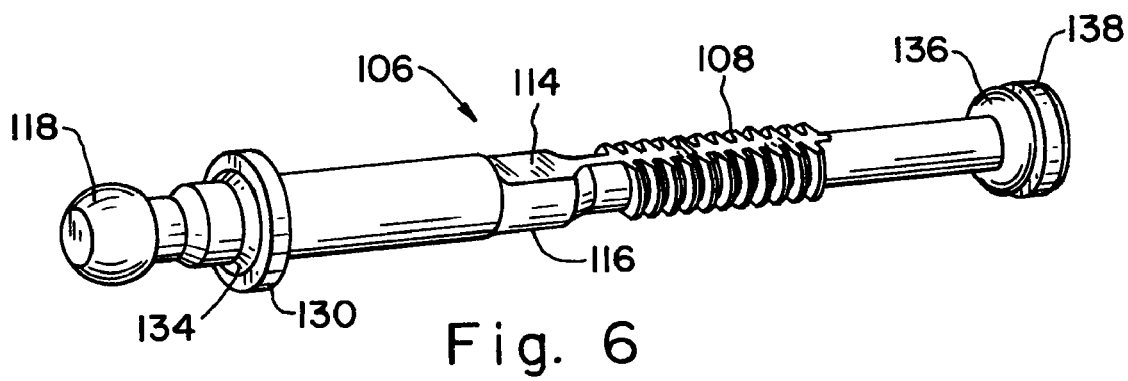
FIG. 6 is an enlarged view of an output shaft that can be used advantageously in a travel limiting headlamp adjuster.

A similar spring force resistance is provided when adjustment gear 100 is rotated in the second direction and the travel limit of shaft 106 is reached in the opposite direction, when output shaft 106 has been advanced to a travel limit where bulbous end 118 is at a furthest axially adjustable position relative to housing 102. As shown in FIG. 4, when protrusion or protrusions 122 have been rotated past the last screw thread or threads 108 at the opposite end from that shown in FIG. 3, output shaft 106 is disengaged from adjustment gear 110 and second O-ring 136 is compressed between an outer end of sleeve 120 and collar 138. Adjustment gear 110 can continue to be rotated freely in the second direction without causing damage to adjuster 100 or to a headlamp assembly in which adjuster 110 is installed. Compression of O-ring 136 between the end of sleeve 120 and collar 138 provides spring force in the opposite direction so that output shaft 106 is urged to a position with the screw thread or threads 108 against protrusion or protrusions 122 for re-engagement of screw threads 108 with protrusion or protrusions 122 if adjustment gear 110 is again rotated in the first direction. Accordingly, rotation of adjustment gear 110 in the first direction causes an immediate re-engagement between adjustment gear 100 and output shaft 106 for the movement of output shaft 106 in the first direction described previously.

Figure 7:
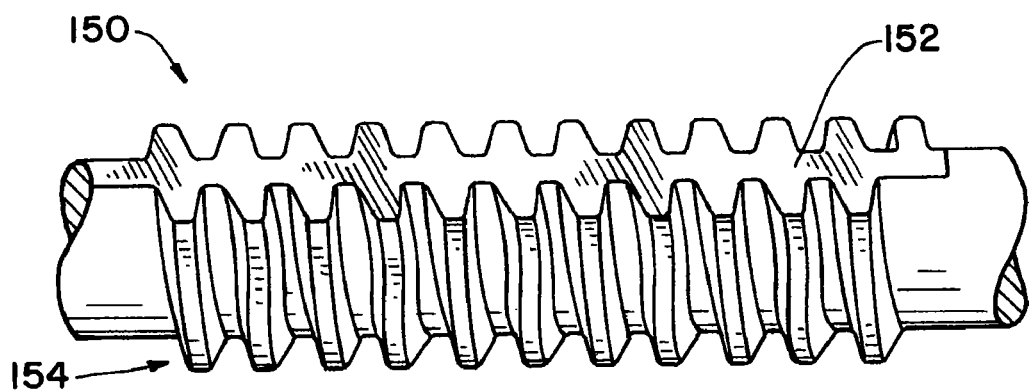
FIG. 7 is an enlarged fragmentary view of an optional thread for the shaft of the adjuster.
Figure 8:
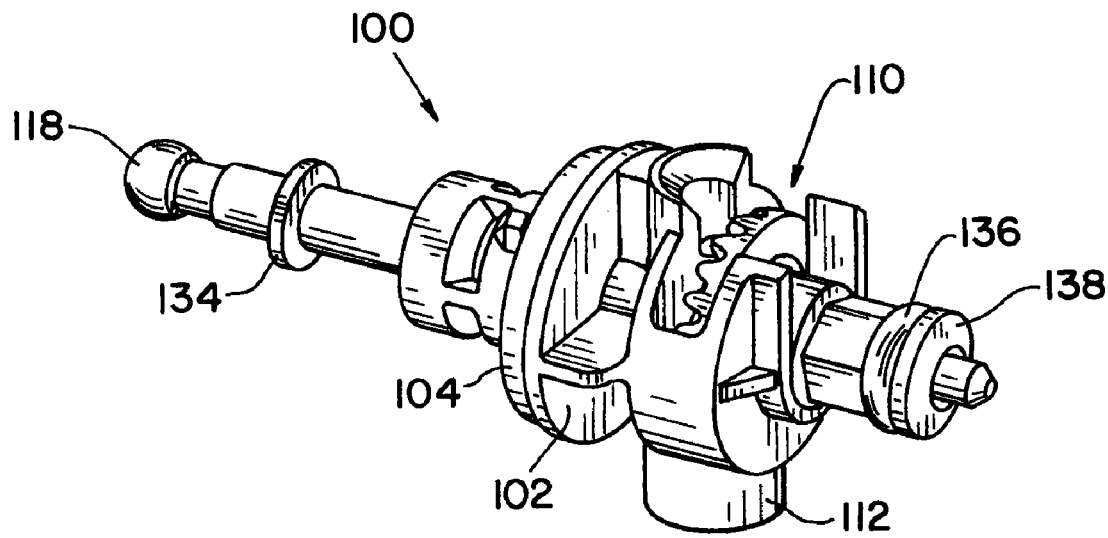
FIG. 8 is a perspective view of the bottom of the headlamp adjuster shown in FIG. 1, but illustrating the adjuster in one extreme position of adjustment.

FIG. 7 is a fragmentary view of an alternative embodiment for an output shaft 150 that can be used advantageously in place of output shaft 106. Output shaft 150 includes a flattened face 152 and a discontinuous thread 154. Discontinuous thread 154 has a wave formation thereto to provide a constant running torque as an adjuster having output shaft 150 is adjusted in an assembly.

Figure 9:
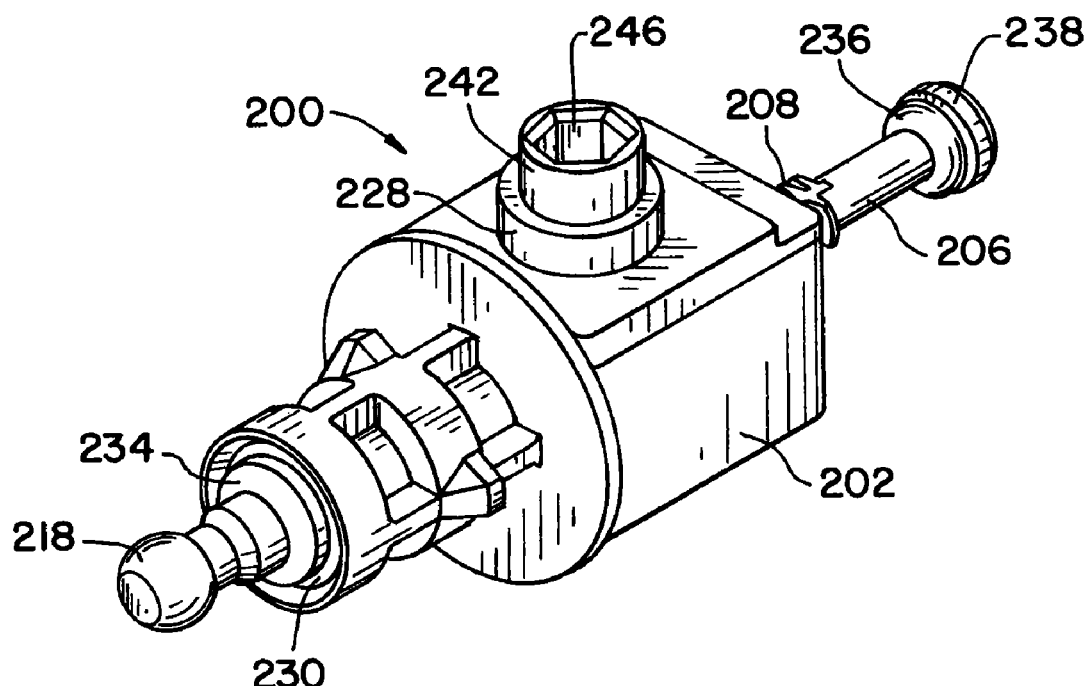
FIG. 9 is an isometric view of another embodiment of a travel limiting headlamp adjuster.
Figure 10:
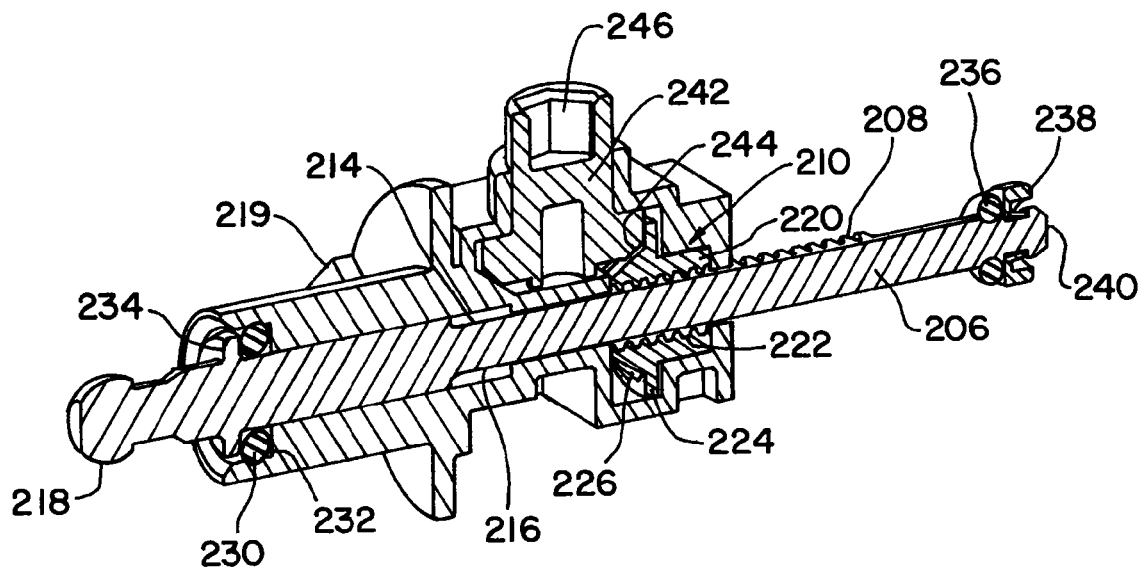
FIG. 10 is a cross-sectioned isometric view of the headlamp adjuster shown in FIG. 9.
Figure 11:
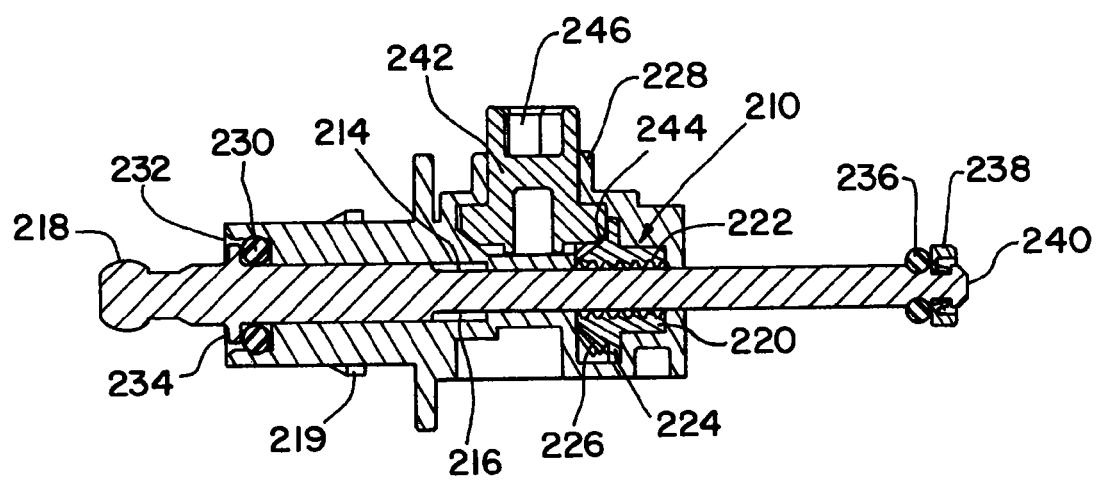
FIG. 11 is a cross-sectional view of the headlamp adjuster shown in FIGS. 9 and 10.

FIG. 9-11 show an alternative embodiment applied to a right angle adjuster 200. Components of second adjuster 200 similar to components of adjuster 100 are identified with similar reference numerals in the "200" series of numbers. Accordingly, adjuster 200 includes a housing 202. An output screw or shaft 206 extends through housing 202, with ends thereof extending outwardly from the housing and a screw thread or threads 208 thereon engaged with an adjustment gear 210 rotatably held in housing 202.

Screw thread or threads 208 can be continuous or discontinuous screw-type threads surrounding shaft 206, and can be of a wave form as described above with respect to output shaft 150. Flattened faces 214, 216 can be provided on opposite sides of shaft 206 such that shaft 206 is held rotationally stable about its longitudinal axis during the operation of adjuster 200. Operative connection of output shaft 206 to a reflector (not shown) can be made using a bulbous end 218 of shaft 206 received in a cup (not shown), and connection of housing 202 within a headlamp assembly can be made via a plurality of locking tabs 219, again as those skilled in the art will understand.

Adjustment gear 210 includes a sleeve 220 having an inwardly directed protrusion or protrusions 222 in the nature of a plurality of drive teeth or one or more threads for engaging thread or threads 208 on shaft 206. Gear 210 further includes a head 224 at one end of sleeve 220 and preferably integral with sleeve 220. Head 224 includes teeth 226 on a face thereof exposed in drive chamber defined by a generally cylindrical housing receiver 228. Rotation of gear 210 engaged with shaft 206 causes axial movement of shaft 206 relative to housing 202, in either direction, depending on the direction of rotation of adjustment gear 210.

An O-ring 230 in a cavity 232 at one end of housing 202 provides a seal against the sliding shaft 206 to inhibit contamination entering the housing. A molded collar 234 is provided at one end of shaft 206 on one side of housing 202, and a second O-ring 236 is disposed on the opposite end of shaft 206 on the opposite side of housing 202 and against a snap-on collar 238 that is securable to shaft 206 against an end 240 of shaft 206.

An input gear 242 is held rotatably in receiver 228 and includes teeth 244 drivingly coupled with teeth 226 of adjustment gear 210. Input gear 242 further defines a tool receiving cavity 246 whereby a drive tool can be inserted for rotating input gear 242, to rotate adjustment gear 210 and alter the axial position of output shaft 206.

O-rings 230, 236 and collars 234, 238 provide axial stops and spring force resistance to the movement of shaft 206 in either direction beyond first and second axially extreme adjusted positions. As shaft 206 reaches its travel limit so that thread 222 no longer engages screw thread or threads 208 at either end thereof, adjustment gear 210 can be continually rotated without further advancement of shaft 206 in that shaft 206 and adjustment gear 210 are disengaged from one another. Since shaft 206 remains in the extreme advanced position, yet adjustment gear 200 can rotate freely, the potential for damage to the headlamp assembly or adjuster 200 resulting from over adjustment is minimize. Compression of one of O-rings 230, 232 at the maximum adjusted axial position for output shaft 206 provides biasing force for the immediate re-engagement of threads 222 and 208 when the rotational direction of adjustment gear 210 is reversed. In that regard, adjuster 200 operates in a manner similar to that described previously herein with respect to adjuster 100.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:
1. An automobile headlamp adjuster comprising:
a housing;
a shaft extending through said housing and having at least one end protruding outwardly of said housing, said shaft having a thread provided along a portion of a length of said shaft, said shaft being axially moveable relative to said housing between first and second axially extreme adjusted positions relative to said housing;

first and second O-rings on said shaft on opposite sides of said housing, one of said O-rings being compressed in said first axially extreme adjusted position of said shaft, and the other of said O-rings being compressed in said second axially extreme adjusted position of said shaft;

first and second collars on said shaft axially outward from said first and second O-rings;

an adjustment gear disposed rotatably in said housing, said adjustment gear engaging said thread of said shaft between said first and second axially extreme adjusted positions of said shaft, said adjustment gear being in a substantial axially fixed and rotatable position in said housing so that rotation of said adjustment gear causes axial movement of said shaft between said first and second axially extreme adjusted positions;

said thread on said shaft and said adjustment gear being drivingly disengaged at said axially extreme adjusted positions of said shaft; and biasing structures activated when said thread on said shaft and said adjustment gear are disengaged at said first and second axially extreme adjusted positions, said biasing structures urging said shaft toward re-engagement of said thread on said shaft with said adjustment gear.

2. The headlamp adjuster of claim 1, one of said collars being removable from said shaft.

3. The headlamp adjuster of claim 1, said shaft having at least one flattened face along at least a portion of the length thereof 4. An automobile headlamp adjuster comprising:
a housing;
a shaft extending through said housing and having at least one end protruding outwardly of said housing, said shaft having a thread provided along a portion of a length of said shaft, said shaft being axially moveable relative to said housing between first and second axially extreme adjusted positions relative to said housing, said shaft having first and second flattened faces on opposite sides thereof;

an adjustment gear disposed rotatably in said housing, said adjustment gear engaging said thread of said shaft between said first and second axially extreme adjusted positions of said shaft, said adjustment gear being in a substantial axially fixed and rotatable position in said housing so that rotation of said adjustment gear causes axial movement of said shaft between said first and second axially extreme adjusted positions;

said thread on said shaft and said adjustment gear being drivingly disengaged at said axially extreme adjusted positions of said shaft; and biasing structures activated when said thread on said shaft and said adjustment gear are disengaged at said first and second axially extreme adjusted positions, said biasing structures urging said shaft toward re-engagement of said thread on said shaft with said adjustment gear.

5. The headlamp adjuster of claim 1, including an input gear drivingly coupled with said adjustment gear.

6. An automobile headlamp adjuster comprising:
a housing;
a shaft extending through said housing and having at least one end protruding outwardly of said housing, said shaft having a thread provided along a portion of a length of said shaft, said shaft being axially moveable relative to said housing between first and second axially extreme adjusted positions relative to said housing;

an adjustment gear disposed rotatably in said housing, said adjustment gear engaging said thread of said shaft between said first and second axially extreme adjusted positions of said shaft, said adjustment gear being in a substantial axially fixed and rotatable position in said housing so that rotation of said adjustment gear causes axial movement of said shaft between said first and second axially extreme adjusted positions;

said thread on said shaft and said adjustment gear being drivingly disengaged at said axially extreme adjusted positions of said shaft;

said thread on said shaft being discontinuous and having a wave form providing prevailing torque to rotation of said adjustment gear; and biasing structures activated when said thread on said shaft and said adjustment gear are disengaged at said first and second axially extreme adjusted positions, said biasing structures urging said shaft toward re-engagement of said thread on said shaft with said adjustment gear.

7. An automobile headlamp adjuster comprising:
a housing;
a shaft extending through said housing and having at least one end protruding outwardly of said housing, said shaft having a thread provided along a portion of a length of said shaft, said shaft being axially moveable relative to said housing between first and second axially extreme adjusted positions relative to said housing;

first and second O-rings on said shaft on opposite sides of said housing;

first and second collars on said shaft axially outwardly of said first and second O-rings respectively, one of said collars being integral with said shaft and the other of said collars being removable from said shaft;

one of said O-rings being compressed in said first axially extreme adjusted position of said shaft, and the other of said O-rings being compressed in said second axially extreme adjusted position of said shaft;

an adjustment gear disposed rotatably in said housing, said adjustment gear engaging said thread of said shaft between said first and second axially extreme adjusted positions of said shaft, said adjustment gear being in a substantial axially fixed and rotatable position in said housing so that rotation of said adjustment gear causes axial movement of said shaft between said first and second axially extreme adjusted positions;

said thread on said shaft and said adjustment gear being drivingly disengaged at said axially extreme adjusted positions of said shaft; and biasing structures activated when said thread on said shaft and said adjustment gear are disengaged at said first and second axially extreme adjusted positions, said biasing structures urging said shaft toward re-engagement of said thread on said shaft with said adjustment gear.

8. The headlamp adjuster of claim 1, said thread on said shaft being discontinuous.

9. An automobile headlamp adjuster comprising:
a housing;
a shaft extending through said housing and having at least one end protruding outwardly of said housing, said shaft having a thread provided along a portion of a length of said shaft, said shaft being axially moveable relative to said housing between first and second axially extreme adjusted positions relative to said housing;

said thread on said shaft having a wave form providing prevailing torque to rotation of said adjustment gear;

an adjustment gear disposed rotatably in said housing, said adjustment gear engaging said thread of said shaft between said first and second axially extreme adjusted positions of said shaft, said adjustment gear being in a substantial axially fixed and rotatable position in said housing so that rotation of said adjustment gear causes axial movement of said shaft between said first and second axially extreme adjusted positions;

said thread on said shaft and said adjustment gear being drivingly disengaged at said axially extreme adjusted positions of said shaft; and biasing structures activated when said thread on said shaft and said adjustment gear are disengaged at said first and second axially extreme adjusted positions, said biasing structures urging said shaft toward re-engagement of said thread on said shaft with said adjustment gear.

10. A vehicle headlamp adjustment device comprising:

a housing;

a shaft extending through said housing, said shaft having an end for engaging a headlamp reflector and a thread provided along a portion of a length of said shaft;

an adjustment gear disposed rotatably on said shaft and in said housing;

said adjustment gear being engaged with said thread between first and second axially extreme positions for said shaft and being disengaged from said thread for positions of said shaft beyond said first and second axially extreme positions;

compressible members axially restrained relative to movement of said shaft, said compressible members being O-rings on said shaft, said O-rings being compressed when said adjustment gear is disengaged from said thread; and said shaft including collars on said shaft outwardly of said O-rings.

11. The vehicle headlamp adjustment device of claim 10, including an input gear drivingly coupled to said adjustment gear.

12. The vehicle headlamp adjustment device of claim 10, said thread on said shaft being discontinuous.

13. A vehicle headlamp adjustment device comprising:

a housing;

a shaft extending through said housing, said shaft having an end for engaging a headlamp reflector and a thread provided along a portion of a length of said shaft;

said thread on said shaft having a wave form providing prevailing torque to rotation of said adjustment gear;

an adjustment gear disposed rotatably on said shaft and in said housing;

said adjustment gear being engaged with said thread between first and second axially extreme positions for said shaft and being disengaged from said thread for positions of said shaft beyond said first and second axially extreme positions; and compressible members axially restrained relative to movement of said shaft, said compressible members being compressed when said adjustment gear is disengaged from said thread.

\* \* \* \* \*